United States Patent

Thaweethai

[11] Patent Number: 5,678,004
[45] Date of Patent: Oct. 14, 1997

[54] AUTHENTICATION APPARATUS AND PROCESS

[75] Inventor: Ladavan Thaweethai, Milpitas, Calif.

[73] Assignee: NEC America, Inc., Melville, N.Y.

[21] Appl. No.: 740,916

[22] Filed: Nov. 5, 1996

Related U.S. Application Data

[60] Continuation of Ser. No. 358,310, Dec. 19, 1994, abandoned, which is a division of Ser. No. 130,456, Oct. 1, 1993, Pat. No. 5,631,897.

[51] Int. Cl.[6] .................................................. C06F 11/00
[52] U.S. Cl. ........................................ 595/187.01; 380/3
[58] Field of Search ...................... 380/3, 4; 395/187.01, 395/188.01

[56] References Cited

U.S. PATENT DOCUMENTS

| | | | |
|---|---|---|---|
| 4,694,492 | 9/1987 | Wirstrom et al. | 380/23 |
| 4,799,153 | 1/1989 | Hann et al. | 364/200 |
| 5,241,594 | 8/1993 | Kung | 380/4 |
| 5,414,833 | 5/1995 | Hershey et al. | 395/575 |
| 5,428,745 | 6/1995 | de Bruijn et al. | 395/200 |
| 5,455,863 | 10/1995 | Brown et al. | 380/23 |
| 5,455,953 | 10/1995 | Russell | 395/739 |
| 5,495,533 | 2/1996 | Linehan et al. | 380/21 |
| 5,510,777 | 4/1996 | Pile et al. | 340/825.31 |

*Primary Examiner*—Robert W. Beausoliel, Jr.
*Assistant Examiner*—Norman Wright
*Attorney, Agent, or Firm*—Sughrue, Mion, Zinn, Macpeak & Seas

[57] ABSTRACT

A wide-area computer network system provides bandwidth based on network demand, throughput, and delay requirements, distribution of network load over multiple, parallel connections from the originating node to a destination node, a method of enabling efficient exchange of packet data routing information, modem pooling, an authentication procedure, and a virtual interface as a logical network interface for providing circuit switched connectivity, such as a connection between a host/application and a remote network.

39 Claims, 3 Drawing Sheets

INVERSE MULTIPLEXING:

GIVEN

PACKET OF SIZE $P_0$
Initialize Delay → infinity
Initialize deviceToUse to First device in the list of devices of V
FOR EACH DEVICE D used BY VIRTUAL INTERFACE V
{

$P_{Tx}$ = pending bytes in D
S = effective bandwidth of D $$device\_delay = \frac{P_{tx} + P_0}{S}$$

if device_delay is less than Delay
{
set Delay ← device_delay
set deviceToUse ← D
}
}

Switch Packet Using deviceToUse

AUTHENTICATION APPARATUS AND PROCESS

This is a continuation of application Ser. No. 08/358,310 filed Dec. 19, 1994, now abandoned, which is a divisional of application Ser. No. 08/130,456 filed Oct. 1, 1993, now U.S. Pat. No. 5,631,897.

FIELD OF THE INVENTION

The present invention relates to wide-area computer networks, and in particular (1) an algorithm which provides a bandwidth allocation based on network demand, throughput, and delay requirements; (2) an inverse multiplexing algorithm which distributes network load over multiple, parallel connections from the originating node to a destination node; (3) a method of enabling efficient exchange of packet data routing information; (4) a system which provides modem pooling, which is a method of sharing of number of modems among many network users; (5) an authentication procedure, which is employed in a network server; and (6) a virtual interface as a logical network interface for providing circuit switched connectivity between networks.

DESCRIPTION OF THE RELATED ART

The prior art in this field include methods of dynamically allocating bandwidth and/or distributing network load over multiple, parallel connections, but these systems, targeted for leased line technology, have the drawback that each physical connection is seen as equivalent to the others. The prior art do not take the effective capacity of the connection into account in deciding which line to switch packets to, and as a result the bandwidth is utilized inefficiently.

Regarding efficient exchange of packet data routing information, the prior art in this field are deficient in the area of propagating routing information, such as the IPX RIP and SAP tables (described below) over networks spanning remote geographical locations.

Prior art exist as to various methods and apparatus of employing authentication procedures, but do not include the use of a finite state machine and an efficient script language for optimum efficiency.

Methods exist in the art for providing modem sharing devices, but no method currently exists in the art for a modem pooling system which allows a number of different types of modems to be shared between many network users.

Prior technologies provide remote connectivity through fixed resource allocation, over permanent circuit connections. Such permanent connections are maintained, regardless of traffic demand, and resource control is minimal and static. A drawback of such systems is that the number of remote connections is limited by the number of available physical ports.

In prior art, either all lines were assumed to be leased lines, or inverse multiplexing was done at the network layer instead of at the link layer. Link level dissimilarities in terms of speed and tariffs were not considered. Also, prior art do not separate the idea of a reachable remote network(s) from the device/link that is used to communicate with the reachable remote network(s).

SUMMARY OF THE INVENTION

Accordingly, one object of the present invention, the Bandwidth-on-Demand Remote Office Network Apparatus and Method (referred to sometimes herein as the "Bandwidth-on-Demand Multiplexing System", "BMS", or the "System" (capitalized)), is to provide a method of resource allocation based on network traffic and delayed threshold values. In the following, these delayed thresholds are indicated by the terms "high water mark" and "low water mark" which indicate reference values for the number of bytes-that are pending for transmission.

With the present invention, a network administrator can specify the throughput and delay requirement for specific remote networks by the parameters high water mark and low water mark. In addition, the network administrator may specify the maximum allowable lines, bandwidth, and cost in connection with a specific remote network. These parameters are used in performing the bandwidth-on-demand function (BOND).

Traffic is distributed over multiple lines or connections to maximize the throughput as well as to minimize delay while minimizing tariff costs. BOND accomplishes this by use of a method referred to as the Load Balancing or Inverse Multiplexing function.

The Bandwidth-on-Demand Multiplexing System incorporates a remote office network manager using the concept of "virtual interface" for providing circuit switched connectivity. Virtual interface resource control is accomplished using the concepts of "capacity units" (CU) for bandwidth allocation control and "tariff units" (TU) for cost control.

Modem Pooling is a way to share a number of modems between many network users. In this way a typical network user needing to dial out to a bulletin board, or to a remote database, does not have to have a dedicated modem and a dedicated telephone line. The present invention specifies a way to be able to (1) interface with different types of modems, and (2) automatically select modem(s) from a pool of different modem types, matching pro-specified modem characteristics. This is accomplished by the Modem Pooling Control Function (MPCF).

Dial-up routers are required to work with different types of modems. Different command sets are required to interface with different modem types. In addition, the modem responses are also different. The MPCF handles these different types by keeping in storage as apriori information definitions of the different modem types and their command sets, to be referenced as needed.

When a modem is needed for dialing out, a modem characteristics must be specified. The modem characteristics describe the required modem's configuration. A cross reference between each modem characteristics and modem types are maintained. For each modem characteristics, there is a set of modem types that satisfies such configuration. Not all modem types will satisfy all modem characteristics. MPCF will select one of the modem types in that subset for dialing out.

MPCF is also capable of retrieving the connection information such as speed and compression type from the modem response. This information is used to determine the capacity unit (CU) of that connection. The capacity unit is used by the BOND function.

Another object of the present invention is to define a mechanism by which a server (or host) can intercommunicate with any other server (or host) when first establishing a communication link between the two. The advantage is that it provides a structural implementation for universally dealing with any Authentication Procedure. This is performed by the Universal Response Mechanism for Authentication Procedure function (URMAP).

A typical network server needs to communicate with multiple types of hosts and/or other servers. URMAP, when implemented on a network server, allows the server to "chat" with any other host or server when first connected. Such conversation (chatting) is usually required for security and control reasons, and is referred to as authentication procedure. The simplest authentication procedure known is the use of a "Login Name" and a "Password."

Today's Enterprise-wide Networks use many different kinds of hosts and servers. These devices need to conform to networking standards in order to be able to co-exist and inter-communicate; one such area is authentication. URMAP can universally be applied to any authentication procedure. Other implementations can certainly perform a similar mechanism.

Another object of the present invention is to provide a significant innovation over the existing technology known in the art as the distance Vector Routing Protocol (RIP), the Novell Routing Information Protocol (IPX RIP), and the Service Advertisement Protocol (SAP). These were designed for local networking and for remote networking using permanent circuit connections. When exchanging Routing information over circuit-switched WAN (Wide Area Network) connections, RIP, IPX RIP, and SAP are neither practical nor efficient. The Routing Information Protocol, Routing Information Exchange Protocol, and Service Advertisement Protocol Functions, together provide the following enhancements to, while remaining compatible with, the distance Vector Routing Protocol (RIP) and the Novell IPX distance vector Routing Information Protocol (IPX RIP) for efficient operation over low bandwidth circuit WAN links:

1. Avoidance of periodic full table broadcasts over WAN connections.
2. Not poisoning routes whenever one connection is dropped. Routes are relearned when connection is reestablished. Routes that are not relearned are aged out and then poisoned.
3. Establishment of WAN connection to propagate table changes.
4. Bandwidth utilization required by routing table maintenance is minimized.

In addition, the present invention's "BMS SAP support" provides the same enhancements for Novell's Service Advertisement Protocol (SAP).

The BOND Function

The bandwidth-on-demand (BOND) function works as follows: Each port of the Bandwidth-on-Demand Multiplexing System has a transmit buffer for queuing outbound packets. All connections to the remote network are monitored. If the sum of the bytes pending transmission on all the connections to the remote network continuously exceeds the high water mark value, the System will establish the highest capacity/lowest cost link available to remote network. BOND ensures that the allowable number of lines, maximum CU, and maximum TU are not exceeded for that remote network.

In addition, BOND constantly checks to see if the sum of the bytes pending on any connection continuously falls below the low water mark value. In this case, when there is more than one connection to the remote network BOND will mark the lowest capacity line with the highest cost which was established last as tear down. The local BMS will cease to use this line for transmission but will still allow the remote to use it.

When the remote needs one less line, it will choose the same line as long as the remote network is a BMS. This is valid because both ends have the same knowledge of the line capacity, the order by which connections are established and the cost of connection (if configured properly). The line chosen for tear down will eventually be dropped due to its exceeding a predefined inactivity period.

Load Balancing or "Inverse Multiplexing"

Multiple physical connections to a virtual interface poses a number of coordination issues. Multiple connections to a single remote destination are supported for routing between two Bandwidth-on-Demand Multiplexing Systems only. The two Systems must coordinate use of the alternate paths presented by multiple connections. In addition, when bandwidth requirements are reduced the two Systems must agree on how and which connections to terminate. The method used in the Bandwidth-on-Demand Multiplexing System provides for peer-to-peer coordination in which each System uses the same methods and algorithms. This alleviates the need to assign a controlling System and a slave System for each connection.

Load Balancing

Each virtual interface can consist of zero to N physical interfaces. Each physical interface has a queue which buffers packets over a single specific serial interface. Packets destined for the remote end of the virtual interface are placed into the "fastest to transmit" physical queue. Queue size is determined based on the number of characters in the queue and not by the number of datagrams. The "fastest to transmit" physical queue is determined by looking at the number of bytes waiting in that interface's queue and the speed of the interface. These two values can be used to determine which queue will finish transmitting the packet first. Note that the size of the input packet must be used to determine which interface will finish transmitting the packet first. For example, two interfaces one running at 9600 bps and one running at 64 Kbps both have the same number of bytes in their output queue. The 64 Kbps interface will finish transmitting the datagram first since it operates at a higher data rate. If the 9600 bps interface contained 3 bytes less in it's queue than the 64 Kbps interface the datagram would still be placed in the 64 Kbps queue because the higher transfer rate of the interface would result in the packet transmission being finished sooner.

As discussed above, Load Balancing works by determining the fastest-to-transmit (FTT) line to forward each packet when there are multiple connections to the remote. The fastest-to-transmit line is determined by calculating a "time to transmit" variable for each line. This variable ($T_{TT}$) equals the sum of the number of pending bytes in the transmit buffer ($N_T$) of the port and the number of bytes in the packet to be forwarded ($N_P$), divided by the DCE (Data Communication Equipment) speed (S) of the port: $T_{TT}=(N_T+N_P)/S$. The line with the lowest $T_{TT}$ is determined to be the fastest-to-transmit line.

Resource Allocation and Load Balancing

Each virtual interface will have associated with it a high water mark, low water mark, maximum CU, maximum TU and maximum serial connection reference values. The interface manager will establish the highest capacity link available for the remote destination if the following conditions are met:

1. The sum of bytes in all serial ports allocated for the remote plus the number of bytes in the external queue for the remote has exceeded the high water mark value (hysteresis) is applied to the algorithm to determine a timed waited queue size to protect against a transient demand establishing a connection.
2. The number of active links is less than the maximum allowed for the remote.

3. The sum of CU's of the active links for the remote is less than the maximum allowed.
4. The sum of TU's of the active links for the remote is less than the maximum allowed.

If there are multiple active links for a remote, packets are placed into the "fastest-to-finish" transmit buffer. The interface manager determines which serial port has the fastest-to-finish transmit buffer by adding the number of bytes in the packet with the number of bytes in the transmit buffer and dividing the result by the speed of the interface. The interface with the lowest value will be established as the fastest-to-finish transmit buffer.

Link Teardown

In order to assure that the last established link will be the first link to tear down, assuming equal CU, an interface manager maintains an inactivity timer for each active link. The timer is reset each time a "keep-up" packet is received or transmitted. The interface manager brings down the link when the timer have reached the inactivity time configured by the user for the virtual interface.

The interface manager uses all active links until the number of bytes in the queues is less than the low water mark value. If the low water mark is reached, the interface manager would choose the link with the least CU and most TU and mark it as "teardown". If there is more than one, the one that was most recently established will be chosen.

The "teardown" mark inhibits the System from using the interface for transmitting packets to the remote BMS. The link will not be disconnected until the remote also stop using the interface for transmission. When the remote needs one less link, it will choose the same link as the one marked by the local since both have the same knowledge regarding which link has the least CU and was established last. When neither end require the link, the timers will expire and the link will be dropped.

A race condition, illustrated in FIG. 1, can occur if both Systems initiate the link at the same time. If this happens, the two Systems would not have the same information regarding which link was established last. As shown in FIG. 1, BMS A marks the left link as the first and the right link as the second while BMS B marks it the opposite. FIG. 2 shows the problem of tearing down the link as will be explained below. The last established link will be the first link to be torn down assuming equal CU.

FIG. 2 shows that BMS A chooses the right link and BMS B chooses the left link for tear down causing both links to be kept up until there is no more traffic between a and b, in which case both links are brought down.

To correct this condition, a BMS will not accept any incoming connection from a virtual interface whose name is lesser than the local BMS's name while the local BMS is in the process of establishing a connection with that virtual interface.

A detailed description of the method of the performance methodology for the BOND function is described below.

Virtual Interface

The Bandwidth-on-Demand Multiplexing System uses the concept of Virtual Interface to represent a logical network interface to provide local hosts/application connection to a remote network. There is no actual physical binding that occurs until the network traffic demands one. When this occurs, a virtual interface may be bound to one or more available physical ports.

Due to the lack of a one-to-one physical binding, the System is able to provide all locally connected networks access to a large number of remote networks (and vice versa)-more than its physical port can normally support.

This notion was conceived for networks needing access to a large number of remote sites on occasional basis where the frequency of access and the duration of connection time to one particular remote site is too small to warrant a leased line connection.

The Bandwidth-on-Demand Multiplexing System performs resource control through the use of two new concepts/attributes, CU and TU, associated with each physical port. CU (Capacity Unit) refers to the approximate capacity or bandwidth of a physical port which is based on the effective bandwidth of the connection. TU (Tariff Unit) refers to the estimated cost of using a port.

Through the use of CU and TU, the System allows a particular virtual interface to take up one or more physical ports at any time to provide appropriate bandwidth based on network traffic. In order to address starvation prevention, each virtual interface is associated with a maximum CU and maximum TU parameter to a control the resource that a virtual interface can consume in case Network traffic becomes very high. Also used is a minimum CU parameter to allow a virtual interface to maintain a minimum bandwidth for guaranteeing minimal delay to some remote site.

Configuring Virtual Interface for Serial Ports

With the Bandwidth-on-Demand Multiplexing System, users can create a number of virtual interfaces to represent all the remote networks that may connect with the local network. The binding between a virtual interface to an actual physical System port depends on the configuration parameters supplied by the user. Users may configure a virtual interface as having a number of dedicated links in which case, the binding will be done during system start-up and will be kept until system shutdown. Otherwise, the binding will be done when needed and will be kept for a period of inactivity.

Connection establishment and Virtual Interface Binding

Dedicated Connection

With the present invention, a system administrator can configure the System to allocate dedicated links to a virtual interface by either explicitly specifying the serial ports to use or by just configuring a minimum CU to be other than zero. The latter method will cause the interface manager to establish the link using one or more of the available dial-out lines to satisfy the minimum requirement.

Physically, a dedicated connection can be implemented by hard-wiring two points, or through a dial-up link.

"Keepalive" messages will be sent periodically to ensure that the dedicated lines are still active. The dedicated lines can be the assigned serial ports or the serial ports acquired to satisfy the minimum CU requirement.

The System is responsible for keeping the link up and periodically retrying if the link goes down. If the actual CU falls below the minimum requirement, the System will automatically establish additional links. It is also responsible for tearing down excess links if it has successfully re-established communication through a serial port which is explicitly assigned to be dedicated.

Dynamic Connection

When the System receives a "bringup" packet that needs to be routed to a remote network, a connection to the remote gateway (which may be a BMS) will be established by the System if one does not exist or if the high-water mark had been exceeded for the destination. Either way, the packet will be queued until communication is possible. If connection cannot be established after a number of tries, an ICMP destination/host unreachable message will be sent for each packet in the queue before discarding it.

The System performs on-demand/as-needed connection establishment to a remote network by doing the following:

(1) If the link to the destination exists and high water mark is not exceeded, the existing link is used.

(2) If the link(s) to the destination exists but the high water mark is exceeded, but another connection is established if the maximum serial line, maximum CU or maximum TU is not exceeded.

(3) If no link exists, an unused phone number is selected from the list in the destination and an appropriate modem is selected from modem pool. If connection fails, the routing module is notified.

(4) If connection is successful, and authentication passed, the device is added to the list of devices for that destination.

The Modem Pooling Control Function (MPCF)

Modem Pooling Control Function

The Bandwidth-on-Demand Multiplexing System supports multiple dial-up ports. Each dial-up port is connected to a modem. When it becomes necessary for the BMS to dial out to a remote host upon user's request, or to route packets via virtual interface, the BMS selects a dial-up port attaching to a modem that matches the required characteristics.

One aspect of the current invention is the MODEMCAP language which was developed to enable storage of the modem capabilities associated with various modems into a database structure. From this database structure modem operations are controlled by the BMS. The MODEMCAP language is described in Appendix A.

Another aspect of the current invention is the ability to use the MODEMCAP file information, as read by the BMS, to control the various modems and to select appropriate modems from the pool. The selection of modems from the pool is based on modem requirements. Because AT command configurations and response mechanisms differ amongst the variety of modems, the BMS uses the MODEMCAP information to control modems and to interpret responses accordingly.

Modem operations are controlled in accordance with the specifications which describe the MODEMCAP file, and by the tags which comprise the modem characteristics file. These control mechanisms establish the profiles for all known modems, and enable automatic modem selection in accordance with diverse dial-in/dial-out factors. The sections "Modem capabilities database" and "Modem characteristics" in the detailed description below provide the algorithms which drive modem control.

The Universal Response Mechanism for Authentication Procedure function (URMAP)

One aspect of the present invention is the "Chat Script" language, disclosed in Appendix B, which has been developed to facilitate URMAP. The "Chat Script Language" is written in Backus Naur form to describe a Finite State Machine (FSM), and is described in detail below. The FSM is used to describe how a server (or host) responds to an Authentication Procedure.

In a typical networking environment, it is required that the server be able to communicate with more than one type of hosts and/or servers. Since authentication procedures vary depending on host, or server, it is necessary for the server to be able to respond differently. For example, the authentication procedure may require login name, password, IP address, etc.

The communication between the local and remote machine is governed by an FSM automation. The Chat Script Language defines the states, initial actions, the events (input), and the actions (output) related to the operation of the automation. States include a list of events: string pattern matching, timeout and condition. Actions include string output, time delay, variable manipulation, transit to another state, and exit from the FSM.

The FSM starts with execution of the initial actions. The last action of the initial actions must transfer to a state. The FSM remains in that state until an event occurs. Once an event occurs, the actions defined in that event are executed. The last action in that event either transfers to another state or exit; otherwise, the FSM remains in the same state. Upon exiting the FSM, the exit code can be specified to indicate the success or failure of the authentication procedure. This allows the BMS to proceed with appropriate action upon success or failure.

Several chat scripts can be defined using the Chat Script Language. The BMS loads Chat Script information and stores it in the database. Different chat scripts can be invoked to perform automatic chatting to different hosts.

The example below illustrates a simple authentication procedure between the BMS and a remote host:
initstate: go to state 1.
state1:
    event 1.Wait for "Login:" string action1—send host name action2—go to state 2
    event2. timeout in 1 minute action1—exit (failure)
state2:
    event 1. Wait for "Password:" string action1—send host password action2—go to state3
    event 2 timeout in 1 minute action1—exit (failure)
state3:
    event 1—Wait for "IP Address" string action 1—tend host ip address (remain in the same state)
    event 2—Wait for "Callback" action1—exit (callback)
    event 3—Timeout in 1 minute action1—exit (success)

The BMS (referred to herein as BMS-A) initiates connection to the remote host (referred herein to as Host-B). Host-B authenticates BMS-A for valid login name and password. An optional part of this process includes prompting for IP address and/or callback functionality. BMS-A invokes the FSM to perform automatic responses to the authentication procedure.

Initially, the FSM in BMS-A starts with state1 by waiting for event1 or event2 to occur. Event1 is defined as waiting for string "Login:" from Host-B. Event2 is defined as 1 minute timeout.

The FSM starts a 1 minute timer. If the timer expires before a "Login:" string is received, then the FSM executes the action defined in event2. However, if the string "Login:" is received before timer expires, then the FSM executes the actions defined in event1. The actions defined in event1 are action1 and action2. The FSM executes these two actions sequentially by first sending its host name to Host-B, then transferring to state2. If the timeout occurs, FSM exits with a failure exit code.

After Host-B receives the login name from BMS-A, it prompts for password. At this point the FSM in BMS-A is currently in state2. State2 is similar to state1 in that there are 2 events. Event1 waits for the "Password:" string from Host-B and event2 is the timeout event. If BMS-A receives a "Password:" string before the timer expires, it sends its host password (BMS-A) to Host-B and transits to state3. If a timeout occurs, the FSM also exits with a failure exit code.

After Host-B receives the password, it validates login name and password. If access is then granted, Host-B prompts BMS-A for an IP address. At this point, the FSM in BMS-A is in state3 awaiting the "IP address" string as the event1. It also waits for the "Callback" string as the event2. The event3 is a timeout event. If BMS-A receives an "IP address" string from Host-B before the timeout occurs, it remains in the same state.

After Host-B receives the IP address from BMS-A, and if Host-B decides to call BMS-A back, a "Callback" string to BMS-A is sent. The FSM in BMS-A is still in state3 waiting for "Callback" text. If BMS-A receives "Callback" string, then the FSM exits and authentication procedure is completed. If BMS-A does not receive "Callback" string, it also exits normally. Different exit codes indicate any exceptional conditions such as callback and failure.

Besides the events described above, the BMS also provides manipulation of variables. Integer variables can be defined and initialized to a value, and incremented or decremented as an action. Testing these variables for zero or non-zero is an event. These variables are useful for implementing looping which simulates the programming language.

A detailed description of the method of the performance methodology for the URMAP function is described below.

Routing Information Protocol,

Routing Information Protocol Exchange, and Service Advertisement Protocol, over Circuit-Switched WAN Connections

FOR INTERNET PROTOCOL (IP) ROUTERS:

The present invention provides two mutually exclusive enhancements to the Distance Vector Routing Protocol (RIP) for routing information exchange over circuit-switched WAN connections as follows:

Default Operation:

1. Exchange an initial full IP (Internet Protocol) routing table, with remote router, every time the first physical connection is established. Subsequently, do not exchange the full table while the connection lasts. Age-out entries that were not re-learned from the remote.
2. Propagate routing table changes only if connection with remote router exists.
3. Once the connection to the remote router is dropped, no exchange of routing table information takes place.

Force Option: If the "force" option is selected then:

1. Exchange full IP routing table, with remote router, only when the first connection is established (very first connection after local boot-up). No full table exchange will take place on subsequent connection establishments until either router is re-booted.
2. Exchange routing table changes if a connection with remote router exists.
3. If a connection to the remote router does not exist, a change in the routing table will trigger the router to establish a connection; the purpose is to propagate the routing table change, and hence keep the router's tables synchronized.
4. Preserve entries learned from the remote even after connection with remote is dropped.

Periodic Option:

This option is specified for compatibility reasons. When this option is selected, the full IP routing table is periodically exchanged, as long as a connection with the remote router exists.

Dial Up Support:

When a connection to a remote router (or network) is dropped, the network(s) reached through the remote router will continue to be advertised as reachable. This is a crucial feature in providing dial back-up support capability. This feature applies regardless of the option selected (i.e., Default, Force, or Periodic). Multiple routes to a network are maintained to provide dial back-up support capability.

FOR INTERNET PROTOCOL EXCHANGE (IPX) ROUTERS:

The present invention provides two mutually exclusive enhancements to the IPX Distance Vector Routing Information Protocol (IPX RIP) and the Service Advertisement Protocol (SAP) exchange over circuit-switched WAN connections as follows:

Default Operation:

1. Exchange an initial full IPX routing table and SAP table, with remote router, every time first physical connection is established. Subsequently, do not exchange the full table while the connection lasts. Age-out entries that were not re-learned from the remote.
2. Propagate routing table changes only if connection with remote router exists.
2. Once the connection to the remote router is dropped, no exchange of routing table and of SAP table information takes place.

Force Option: If the "force" option is selected then:

1. Exchange full IPX routing table and SAP table, with remote router, only when the first connection is established (very first connection after local boot-up). No full table exchange will take place on subsequent connection establishments until either router is re-booted.
2. Exchange routing table and SAP table changes if a connection with remote router exists.
3. If a connection to the remote router does not exist, a change in the routing table and/or the SAP table will trigger the router to establish a connection; the purpose is to propagate the routing table change, and hence keep the router's tables synchronized.

Periodic Option:

This option is specified for compatibility reasons. When this option is selected, the full IPX routing table and the SAP table are periodically exchanged.

Dial Up Support:

When a connection to a remote router (or network) is dropped, the network(s) reached through the remote router will continue to be advertised as reachable. This is a crucial feature in providing dial back-up support capability. This feature applies regardless of the option selected (i.e., Default, Force, or Periodic). Multiple routes to a network are maintained to provide dial back-up support capability.

RIP and Novell RIP

By default, the Bandwidth-on-Demand Multiplexing System will propagate its routing tables (RIP and Novell RIP) to all ethernet and token ring interfaces, but not to the virtual interfaces. The System will listen to the advertisements coming in from all interfaces.

Users are allowed to change this default configuration. Following are some of the command options provided the user by the present invention in its preferred embodiment:

enable command:

This command enables rip broadcast to a specified physical or virtual interface. The interface name supplied can refer to ethernet, token ring or virtual interface. An option varies the period by which the routing table is propagated while the connection is active. For ethernet and token ring, the default is to propagate routes every 30 seconds. For virtual interface, the default is for an initial full table exchange with propagation to be done only for updates while the link is active. The force option applies only to virtual interfaces and it forces the System to establish a connection to propagate a routing table update. (Note: "update" means a change in routing table occurred.)

disable command:

Deactivates rip broadcast and rip responses on the specified physical or virtual interface.

accept and refuse commands:

Tells the System to listen or not listen to rip broadcast coming in from a particular router specified by address or interface name.

list command:

displays the configuration for RIP. The list only includes interfaces that are currently enabled for RIP request and response:

Host IP Address, IPX network id/host id, Interface Name
Propagation Period (# of seconds—periodic, aperiodic, or forced)

RIP add Novell RIP Enhancements

RIP advertisements on serial lines can be configured to:
1) when connection is established (a) age out prior information learnt through the interface (b) send a full table broadcast and request for a full table broadcast (c) subsequently send only table changes for the duration of the connection.
2) on the very first connection establishment after a system reboot, (a) send a full table broadcast and request for a full table broadcast, (b) subsequently send only table changes even if a connection does not exist (forcing a connection establishment if needed), and (c) do not send a full table broadcast nor request a full table broadcast on subsequent connection establishments.
3) standard periodic broadcast while the interface is connected.

RIP broadcast can be configured to not affect the inactivity timer of the link, i.e., the interface manager will not consider routing table advertisements as link activity.

Routing table will maintain multiple routes to a destination.

Routes using a virtual interface will allow the cost of the route to dynamically change. This would not be applicable to RIP but for OSPF migration. (Note: a future option might be to prevent link state advertisements from occurring each time the cost for a virtual interface changes.)

A virtual interface can be configured to publish or not publish RIP learned routes. If the interface is configured as publish, then all routes learned through the interface are marked as Public. Otherwise all routed learned through the interface are marked as Private. Public routes learned through a Dial-out only or Dial-in/Dial-out virtual interface will continue to be included in RIP advertisements and responses even when the virtual interface is not connected. Public routes learned through a Dial-in only virtual interface will be poisoned and saved when the virtual interface disconnects. Private routes are never included in RIP advertisements or responses.

Public static routes for a dial-in only interface will not be advertised if there is no active link with the virtual interface. It will be poisoned then saved after the link goes down.

When an interface (virtual, ethernet or token ring) goes down, e.g., it is marked down administratively or the physical link is down, all dynamic routes learned from the interface will be poisoned and discarded. Static routes associated with the interface will be poisoned then saved.

When the interface comes back up, the static routes will be restored into the routing table.

When a remote peer goes down, it is not necessary to update the routing table until a packet needs to be forwarded to the remote peer using the virtual interface associated with it. The packet is used as a probe to determine if the link is still valid. If the remote peer is unreachable, all the routes that use the virtual interface are poisoned. All the routes will be restored after a pre-determined period to allow reprobing of the link status at a later time. This is especially important if the virtual interface is configured to be dial out only.

Note:

Saving and discarding static routes does not necessarily mean a separate storage is used. Saving can be done by having a separate field to store original cost of route. Discarding can be done by setting a flag in the routing table to indicate that the route is inactive.

The commands used to configure static routes are:

Add and Addprivate:
Add creates a static public route entry while Addprivate creates a static private route entry, i.e., RIP will not advertise private entries.

Drop: Removes a static route entry.

Flush: Removes all dynamically learned entries, keeps static entries.

List: Displays RIP table entries. The display includes the following fields:
Network/bits:
Interface:
Gateway:
Hops/Ticks:
Expiry time:
Status:

RIP: The entry was learnt via RIP.

Loc: The entry was configured statically

P: The entry is private and will not be included in advertisements/responses

V: The entry is valid and will be included in advertisements/responses

I: The entry is no longer valid and will not be included in advertisements/responses SAP (Service Advertisement Protocol)

The default SAP configuration is to advertise the Service Information table to all ethernet and token ring interfaces but not to the serial interfaces. The Bandwidth-on-Demand Multiplexing System will listen to advertisements from all interfaces.

The BMS SAP support includes the recognition of query packets and generation of query response packets. Query packets can be a Nearest Server Query or a General Service Query. These may come in from a local or remote workstation or router. The System will generate Nearest Server Response and General Query Response if it has the information in its SAP table.

It is recommended that periodic service advertisements be left disabled for remote networks. Instead, static SAP entries and query packets may be sufficient. The System may send a General Query packet each time a connection is made with a virtual interface if IPX routing is enabled and the local BMS is allowed to initiate connection with the virtual interface. Remote hosts dialing into the System (in packet mode) may send query packets to learn services known to the local BMS.

Bandwidth-on-Demand Multiplexing System SAP Enhancements

Service Advertisements on serial lines can be configured to:
1) when connection is established (a) age out prior information learnt through the interface (b) send a full table broadcast and request for a full table broadcast (c) subsequently send only table changes for the duration of the connection.
2) on the very first connection establishment after a system reboot, (a) send a full table broadcast and request for a full table broadcast, (b) subsequently send only table changes even if a connection does not exist (forcing a connection establishment if needed), and (c) do not send a full table broadcast nor request for a full table broadcast on subsequent connection establishments.
3) standard periodic broadcast while the interface is connected.

SAP broadcast can be configured to not affect the inactivity timer of the link, i.e., the interface manager should not consider service advertisements as link activity.

A virtual interface can be configured to publish or not publish SAP learned services. If the interface is configured as publish, then all services learned through the interface are marked as Public. Otherwise all serviced learned through the interface are marked as Private. Public services learned through a Dial-out only or Dial-in/Dial-out virtual interface will continue to be included in SAP advertisements and responses even when the virtual interface is not connected. Public services learned through a Dial-in only virtual interface will be poisoned and saved when the virtual interface disconnects. Private services are never included in SAP advertisements or responses.

Public static services for a dial-in only interface will not be advertised if there is no active link with the virtual interface. It will be poisoned then saved after the link goes down.

When an interface (virtual, ethernet or token ring) goes down, e.g., it is marked down administratively or the physical link is down, all dynamic services learned from the interface will be poisoned. Static services associated with the interface will be poisoned then saved. When the interface comes back up, the static services will be restored into the routing table.

When a remote peer goes down, it is not necessary to update the routing table until a packet needs to be forwarded to the remote peer using the virtual interface associated with it. The packet is used as a probe to determine if the link is still valid. If the remote peer is unreachable, all the services that are reached through the virtual interface are poisoned. All the services will restored after a predetermined period to allow reprobing of the link status at a later time. This is especially important if the virtual interface is configured to be dial out only.

Note:
Saving and discarding static services does not necessarily mean a separate storage is used. Saving and Discarding can be done by using a field in the service information table to store the original hop count and another field to set a flag to indicate that the service is inactive. Also, service update/advertisement follows the configuration done for SAP.

Configuring Static IPX Services

Static service configuration can be used to enter IPX services provided by the System or services of servers that are directly or indirectly connected to the System. SAP can be used to learn the latter. Static services of remote servers are normally created during virtual interface configuration. Following are some of the command options provided for the user by the present invention in its preferred embodiment:

add and addprivate command: add creates a static public service entry while addprivate creates a static private service entry, i.e., SAP will not advertise private entries.

delete command: removes a static service entry.

flush command removes all dynamically learned entries, keeps static entries.

list command displays SAP table entries. The display includes the following fields:

Status:

SAP: The entry was learnt via SAP.

Loc: The entry was configured statically

P: The entry is private and will not be included in advertisements/responses

V: The entry is valid and will be included in advertisements/responses

I: The entry is no longer valid and will not be included in advertisements/responses Service Type Service Name Source Interface Name Hop count—number of router hops to the server Expiry time Network Address/Host Number/Socket Number of the service Configuring SAP The Bandwidth-on-Demand Multiplexing System allows user to change the default setting of SAP.

Detailed descriptions of the methods of supporting and enhancing RIP, IPX RIP, and SAP are described below.

BRIEF DESCRIPTION OF THE DRAWINGS

FIG. 4 shows the algorithm, written in pseudo "C" (C style) computer programming language, for accomplishing inverse multiplexing, according to the present invention.

DETAILED DESCRIPTION OF THE PREFERRED EMBODIMENT

Figure 1:
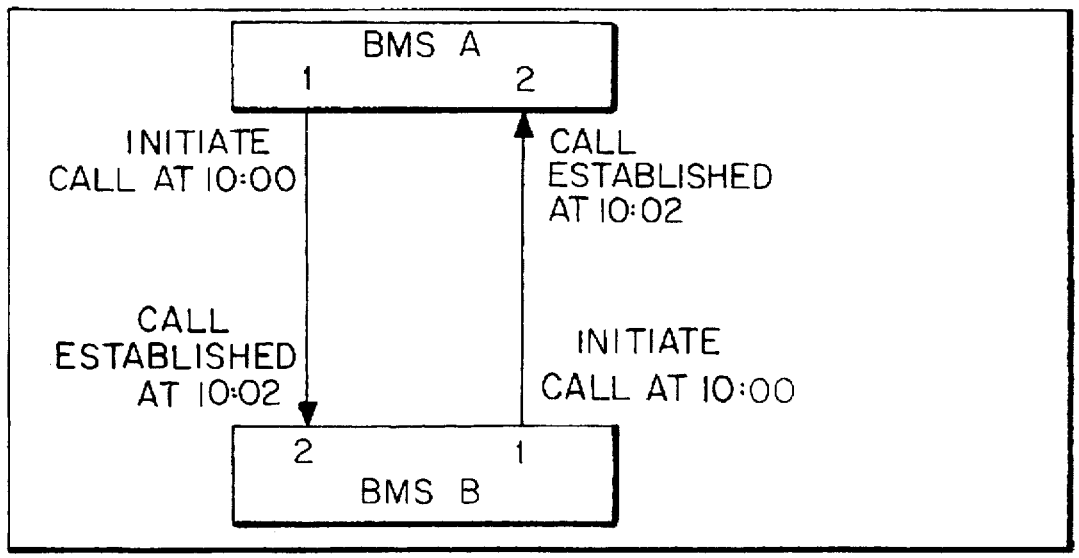
FIG. 1 and FIG. 2 are diagrams illustrating a teardown race condition and how it may be handled according to the present invention.
Figure 2:
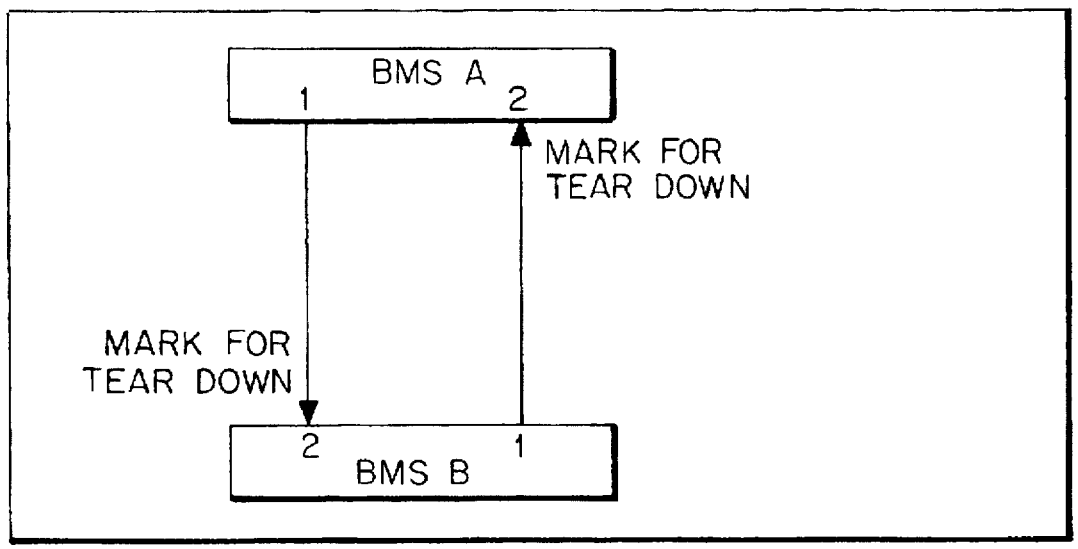
Figure 3:
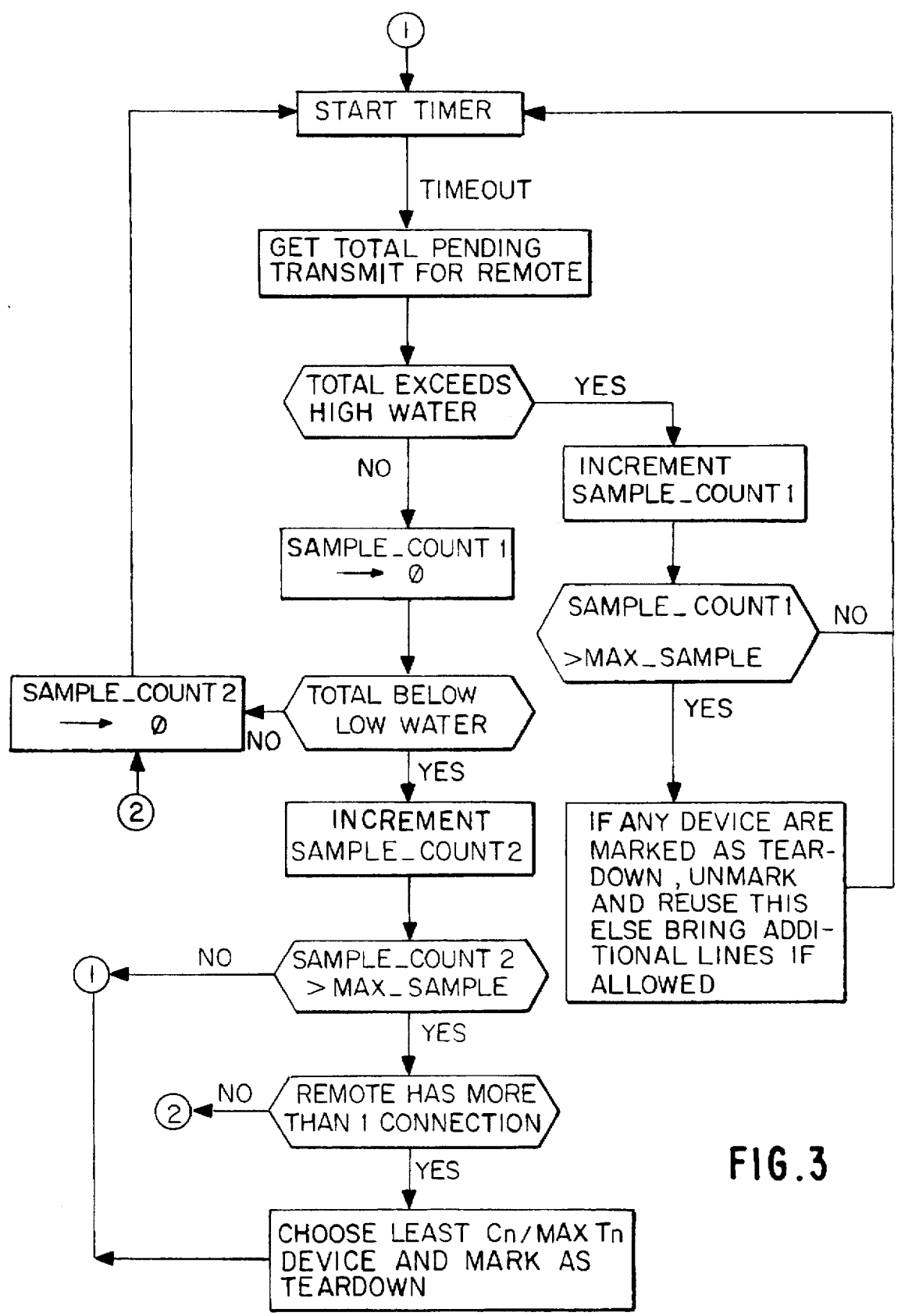
FIG. 3 is a flow chart illustrating the method for performing the BOND function according to the present invention.

A detailed description of the best mode known at present for performing the method of the BOND function is now described:

With reference to FIG. 3, a timer is used to trigger a periodic procedure to monitor the total number of bytes pending for transmission. If this number is not above the high water mark or below the low water mark, then first and second counters are set or reset to zero. Then the timer is restarted to signal the next monitoring period. But if this total either exceeds the high water mark or drops below the low water mark then the operation proceeds as follows:

If the number of bytes pending transmission is greater than the high water mark, then the first counter is incremented if at that time the first counter is not greater than a reference value set by the user. Then the timer is restarted to signal the next monitoring period.

If, however, the first counter does exceed the maximum reference value then either a device marked as teardown is unmarked and reused, or if no such device exists then additional lines are utilized if allowed and available. Then the timer is restarted to signal the next monitoring period.

In the case where the total number of bytes is less than the low water value then the second counter is incremented. If that counter is less then or equal to the user set reference value, then the timer is restarted to signal the next monitoring period.

If, however, the second counter is then greater than the reference value then (1) if the remote does not have more than one connection, the timer is restarted to signal the next monitoring period, or (2) if the remote has more than one connection, then the device with the least CU and maximum TU is marked for teardown. Then the timer is restarted to signal the next monitoring period.

Inverse Multiplexing

As illustrated in FIG. 4, a delay variable is first set to an extremely large number. Then the following procedure is followed for each device D used by virtual interface V.

For each device, the sum of the number of bytes in the packet plus the number of bytes pending in that device is divided by the effective bandwidth of the device. If the result of this calculation is less than the delay variable then the delay variable is set to the result of the calculation and a "device to be used" pointer is set to indicate that device. This process is repeated for all the devices so that finally the device with the lowest delay is found. Then the packet is switched (placed into the device queue) using the device indicated by the "device to be used" pointer.

In a current embodiment of the present invention, the BOND function is performed by a computer processor and the instructions are written in the "C" computer language.

A detailed description of the best mode known at present for performing the method of the MPCF function is now described:

Modem capabilities database

Upon reading the MODEMCAP file, the BMS maintains modem capabilities information in the database. To describe the concept and algorithm that MPCF uses, an example of a MODEMCAP file is given below. As the result of reading the example MODEMCAP file, the MPCF maintains the following modem capabilities information.

1. List of modem type names. Each item in this list is unique and identifies the modem type. The modem type names provided in the example are N9631, N9635EP, and N9635E2.

2. For each of the listed modem types, MPCF maintains information relevant to modem interrogation, text patterns, and command structures. The following examples describe these functions using the N9635EP, but it should be noted that these also apply to the N9631 and N9635E2 modem types.

a) Interrogate AT command string and the modem response. For example, the interrogate AT command of N9635EP is "ati3" and the corresponding modem response is "N9635E/PLUS".

b) Modulation pattern text and a list compression pattern text. For example, the modulation pattern text of N9635EP is "CARRIER" and the list of compression pattern text is "V.42BIS" and "MNP 5".

c) System defined tags and the corresponding AT command string.

The following user defined tests are maintained:
InitConf
Dial
AutoAnsEnable
AutoAnsDisable
HookGoOn
HookGoOff
CDdelay For example, the AT command which corresponds to "InitConf" of N9635EP modem is "at&fe\v3&d2&c1\q3". All other system defined tags of N9635EP are inherited from N9631. MPCF retrieves the complete system defined tags and the corresponding AT command strings from the N9631 modem.

d) User defined tags and the corresponding AT command string. These user defined tags of N9635EP are "DCESpeed2400", "DCESpeed4800", "DCESpeed9600t", "DCESpeed14400", and "ARAConfig". The corresponding AT commands for these user defined tags are: "at%g1%b3", "at%g1%b4", "at%g1%b6", "at%g1%b7", and "at\n0%c2" respectively.

Example MODEMCAP file

The following is an example of a MODEMCAP file. This example is used throughout this section to demonstrate the MPCF and the modem interactions.

```
Dr.BonD MODEM CAPABILITIES
N9631: {
        #(Interrogate,ati){(3,"N9631")};
        (InitConf,at&fle0l1&d2&c1<3[r]0){};
        (CDdelay,ats10=) {};
        (AutoAns,ats0=) {(Disable,0),(Enable,1)};
        (Dial,atdt) {};
        (Hook,ath) {(GoOn,0),(GoOff,1)};
        (DCESpeed,at%b){(2400,3),(4800,4),(9600,5),(9600t,6)};
}
N9635EP: {
        #(Interrogate,ati){(3,"N9635E/PLUS")};
        (InitConf,at&fel3&d2&c1<3){};
        $include(N9631,CDdelay);
        $include(N9631,AutoAns);
        $include(N9631,Hook);
        $include(N9631,Dial);
        (ARAConfig,at 0%c2) {};
        (DCESpeed,at%g1%b){(2400,3),
        (4800,4),(9600t,6),(14400,7)};
        &(ModRate,"CARRIER "); &(Compression,
        "V.42bis","REC");
}
N9635E2: {
        #(Interrogate,ati){(3,"N9635E2")};
        (InitConf,at&fe0l1&d2&c1<3){};
        $include(N9631,CDdelay);
        $include(N9631,AutoAns);
        $include(N9631,Hook);
        $include(N9631,Dial);
        (DCESpeed,at%g1%b){(2400,3),(4800,4),(9600t,6)};
        &(ModRate,"CARRIER "); &(Compression,
        "V.42bis","REC");
}
```

Modem characteristics

The Modem characteristics function is used for selection criteria during selection of the appropriate modem for dialing out. It is also used to configure a modem, which is attached to a dial-up port, in preparation for incoming calls. A modem characteristics record contains a set of user defined tags. Refer to Appendix "A" for the definition of user defined tags.

Controlling modem operations

MPCF retrieves the modem capabilities which are stored in the BMS database for use in controlling the modem's operation. The modem type attached to each dial-up port is input to the BMS. Since different modem types can be attached to a different dial-up port, the MPCF uses the modem type name specified for that port as the key to retrieve the specific modem information from the database. Key elements of modem control include modem initialization, configuration of the modem for acceptance of incoming calls, retrieval of modem information relevant to modulation and compression, and dial-out modem selection.

1. Modem Initialization.

When the MPCF initializes a port, MPCF sends a series of AT command strings to the modem and waits for the modem response. If the modem does not respond with "OK", the dial-up port is then marked as non-operational. If the modem responds affirmatively, MPCF continues to send the next AT command string until the initialization process is complete. The following list includes the system defined tags that MPCF sends the corresponding AT command strings to the modem.

(1) InitConf

MPCF sends the AT command string.

(2) CDdelay

MPCF appends the time delay unit in tenths of a second to the AT command string before sending to the modem. The time delay is input to BMS.

(3) AutoAnsEnable or AutoAnsDisable

MPCF sends the AT command string corresponding to "AutoAnsEnable" if the dial-up port is configured to accept incoming calls; otherwise, MPCF sends the AT command string. The accept incoming call option is input to the BMS.

(4) HookGoOn or HookGoOff

MPCF sends the AT command string corresponds to "HookGoOff", if it finds that the modem does not respond to any of the command described in (1) through (4); otherwise, it sends the AT command string corresponds to "HookGoOn".

2. Configuration of the modem for acceptance of incoming calls. The MPCF configures the modem attached to the dial-up to wait for incoming calls. The required configuration is defined using modem characteristics. The user defined tags are defined in the modem characteristics record. The user defined tags and modem characteristics are input to the BMS. The MPCF retrieves each corresponding AT command of the user defined tags as defined in the modem characteristics records, and sends the AT command string to the modem.

In the above example, the modem characteristics record called "ARAport" is defined to contain "ARAConfig" and "DCESpeed14400". The "ARAport" modem characteristics is used as the configuration to wait for incoming call on a dial-up port which is attached to N9635EP. MPCF sends the following AT command string to the modem. MPCF waits for an "OK" modem response after sending each AT command string. If the modem does not respond, then the port is marked as non-operational.

(1) "at\n0%c2" corresponds to "ARAConfig"

(2) "at%g1%b7" corresponds to "DCESpeed14400".

3. Retrieving modulation rate and compression information.

When the modem attached to the dial-up port of the BMS connects to a remote modem, it sends the connection information to the BMS. The modulation rate and compression is retrieved regardless of the originating (dialing) or receiving (answering) status of the modem attached to the BMS dial-up port. The MPCF scans the text for modulation rate (baud rate) and compression text. If the digits are preceded with the specified modulation rate text, the digits are read as the modulation rate. If the text matches one of the specified compression texts in the list, the connection then employs some type of compression. The BMS uses this information to compute the CU (Capacity unit) used for load balancing. A CU unit is equivalent to 2400 baud.

For the above example, if the N9635EP modem connect text which is sent from the modem to the MPCF is "CONNECT 19200/CARRIER 14400 V.42BIS", then the MPCF interprets the modulation speed of this connection as 14400 baud, with the compression option turned on.

4. Selecting modem when dialing out.

A different modem configuration is required to dial to a different host or virtual interface. Some of the modem configuration may not be supported by all modem types. Thus, MPCF is responsible for selecting the dial-up port which is attached to an appropriate modem when dialing out. The user and virtual interfaces specify the modem characteristic when dialing out. This modem characteristic and the user defined tags are input to BMS. MPCF maintains a cross reference between the modem characteristics and the modem type. For each modem characteristics, MPCF keeps a list of modem type names that satisfies the requirement.

To determine whether a modem type satisfies the requirement of a modem characteristics, the modem's capabilities must contain every user defined tag which is specified in the modem characteristics record. For example, if the modem characteristic "DefaultModemChar" is defined which does not contain any user defined tags, then all modem types satisfy the requirement which includes N9631, N9635E2, and N9635EP modems. When specifying "DefualtModemChar" as the modem characteristics when dialing out, MPCF selects one of the dial-up ports which attached to either N9631, N9635E2, or N9635EP.

In another example, the modem characteristics "V.42bis" is defined to contain the user defined tag "DCESpeed14400". The N9635EP is the only modem type that contains "DCESpeed14400" in its definition. When the user or virtual interface specifies "V.42bis" as the mode characteristic when dialing out, MPCF then selects a dial-up port that is attached to an N9635EP. After selecting the dial-up port, MPCF also sends out the corresponding AT command string to the modem to set the modem in the required configuration. In this example, MPCF sends "at%g1%b7" to the modem and waits for the "OK" response before dialing out.

MPCF retrieves the corresponding AT command of the "Dial" system defined tag of the modem type. MPCF appends the phone number to that AT command string before sending to the modem. For example, the "atdt9800-123-1234" string is used to dial out on a dial-up port which is attached to N9635EP. After the dialing string is sent to the modem, the modem undergoes modem training with the remote modem. Once the connection is made, MPCF retrieves the modulation rate and compression information from the modem response as described in section 3.

In a current embodiment of the present invention, the MPCF function is performed by a computer processor and the instructions are written in the "C" computer language.

A detailed description of the best mode known at present for performing the method of the URMAP function is now described:

The BMS reads the chat script file and stores the following information in the database:

1. List of chat script names. Each name is unique. It identifies the chat script record when the FSM (Finite State Machine) is invoked.

2. For each chat script record found in the list of chat script names:

(1) List of initial actions.

(2) List of states.

(3) List of variables name used in the script.

(4) List of events in each state.

(5) List of actions in each events.

Then the FSM is invoked. The best mode known at present for executing the FSM is by performing the following algorithm, written below in pseudo "C" (C style) computer programming language:

(1) List of initial actions.

(2) List of states.

(3) List of variables name used in the script.

(4) List of events in each state.

(5) List of actions in each events.

Then the FSM is invoked. The best mode known at present for executing the FSM is by performing the following algorithm, written below in pseudo "C" (C style) computer programming language:

Algorithm for executing the Finite State Machine (FSM):

```
FSM-execution (chat_script_name, port_name,
virtual_interface_name)
{
    integer current_state = 0 for each action i in the initial actions list
    {
        execute_action(action i)
    } while (current_state != EXIT)
    {
        event = register_events(current_state)
```

```
            if event != 0
                event = wait_for_event(state)

for each action i in the event
            {
                execution_action(action i)
            }
        }
    }

/* execute_action executes the input action.  It sets the
     * current_state if the state changes.
     */ execute_action(action)
    { param = parameter of this action switch (action) { case send_string:
            if param is a keyword
                sends_substitute_string(param)
            else
                send_text_string(param)
```

```
        case transit:
            current_state = param case delay:
            sleep(param)

case increment:
            increment content of param by 1 case decrement:
            decrement content of param by 1 case exit:
            current_state = EXIT

}

}

/* register_events function registers events of the specified
 * input state.  It returns 0 if event has not occurred yet.
 * It returns event number if the event has occurred
 */
register_events(state)
{
    for each event i found in input state
```

```
            {
                param = parameter of event i
                switch (event i)
                {
                    case timeout:
                        start timer to expired in param unit
                        return 0 case recv_string:
                        do nothing
                        return 0 case zero:
                        checks content of param variable to be zero
                        return event i case non-zero:
                        checks content of param variable is non-zero
                        return event i
                }
            }
        }

/* wait_for_event function waits for one of the register events
 * (timeout or recv_string) to occur.  Once it occurred, it
```

```
 * returns the event number.  If timeout occurs, it returns
 * timeout's event number.
 */
event wait_for_event(state)
{
    event = event number of the time out event in the input state
    if at least one event in the input state is a recv_string {
        read_failed = false
        k = 0
        while (read_failed != true) {
            read_failed = read_text(port,buffer,k,l)
            k = 1+1
            if read_failed != true {
                for each event i in input state {
                    if event i is a recv_string event {
                        text = matching string
                        check for matching pattern (buffer, text)
                        if match
                            return event i
                    }
                }
            }
        }
    }
    return event
}
```

- 61 -

```
    /* read_text function read available text from a specified port
     * into a buffer.  read stores text in buffer starting at
     * position k(input) to l(output).
     */
5   Boolean read_text(port, buffer, k, l)
    {
        x = number of bytes available at the port
        read x bytes from port and store in buffer starting at k
        position
10      if read failed
            return false
        l = k+x-1;
        return true;
    }
15

/* sends_substitute_string function sents the text corresponding
     * to the input keyword to the port
     */
    sends_substitute_string(keyword)
20  {
        switch (keyword)
        {
            case $hostname:
                text = BMS' hostname
25
            case $hostpassword:
```

— 62 —

```
                    text = BMS' password case $dialoutname:
                text = dialout name of the virtual interface case $dialoutpassword
                text = dialout password of the virtual interface }
        write text to port
    }
    /* send_string(text) writes the input text to the port
     */
    send_string(text)
    {
        write text to port
    }
```

The best mode known at present for performing the method of RIP supporting and enhancement is by performing the following algorithm, written below in pseudo "C" (C style) computer programming language:

Algorithm for Enhancements to Internet Protocol (IP) Routing Information Protocol (RIP):

```
        ip_rip_IfaceUp(
  5         Iface
            )
        {
            mark iface as connected;
            if(Iface is NOT configured for Force OR
 10             (Iface is configured for Force AND
                  this is the first connect after system reboot)
                )
            {
                /* The age out ensures invalid information is not
 15              * retained due to lost synchronization.
                 */
                start ageOutTimer for all routes that use this
                interface;
                /* The full table send/request forces both routers to
 20              * synchronize their tables.
                 */
                send full table broadcast;
                request full table broadcast;
                if(Iface is configured for Force)
 25                 mark Iface as having connected after reboot;
                if(Iface is configured for Periodic)
```

```
                    start periodic broadcast on Iface;
            }
        }

5      ip_rip_IfaceDown(
            Iface
            )
        {
            stop all broadcasts on this Iface.
10          mark Iface as not connected.
            if(link state is bad)
                invalidate all routes through Iface;
        }

15      ip_rip_output(
            destinationNetworkAddress,
            triggeredOutput,
            outputIface
            )
20      {
            if(outputIface is disabled for IP RIP)
                return;
            if(outputIface is not connected)
                return;
25          if(outputIface is a virtual interface AND
                (outputIface is configured for Force AND
```

– 65 –

```
                    NOT first connect after system reboot)
            )
                return;
            if(triggeredOutput)
5                   send only changes to IP RIP table;
            else
                    send complete IP RIP table;
        }

10  ip_rip_input(
        ripPacket,
        sourceNetworkAddress,
        inputIface
        )
15  {
        if(inputIface is refused or sourceNetworkAddress is refused)
        {
            discard packet;
            return;
20      }
        if(sanity checks on ripPacket failed)
        {
            discard packet;
            return;
25      }
        switch(RIP operation requested)
```

```
{
case RIP_REQUEST:
    if(inputIface is disabled)
    {
        discard packet;
        return;
    }
    send requested information if it is available;
case RIP_RESPONSE:
    perform IP standard RIP algorithm;
    if(route to be added already exists and is static)
        ignore RIP learnt route;
    if(inputIface is configured for Publish)
        add new route as Public (to be included in
        RIP advertisements)
    else
        add new route as Private (not to be included
        in RIP advertisements)
    NOTE: Multiple routes are maintained by the routing
    table manager.
}
if(routing table was modified){
    send updates to all connected interfaces;
    send updates to all interfaces configured as Forced;
}
}
```

The best mode known at present for performing the method of IPX RIP and SAP supporting and enhancement is by performing the following two algorithms, written below in pseudo "C" (C style) computer programming language:

Algorithm for Enhancements to Novell's IPX Routing Information Protocol (RIP):

```
        ipx_rip_IfaceUp(
10              Iface
                )
        {
                mark iface as connected;
                if(Iface is NOT configured for Force OR
15                      (Iface is configured for Force AND
                           this is the first connect after system reboot)
                   )
                {
                        /* The age out ensures invalid information is not
20                       * retained due to lost synchronization.
                         */
                        start ageOutTimer for all routes that use this
                interface;
                        /* The full table send/request forces both routers to
25                       * synchronize their tables.
                         */
```

```
                    send full table broadcast;
                    request full table broadcast;
                    if(Iface is configured for Force)
                            mark Iface as having connected after reboot;
5                   if(Iface is configured for Periodic)
                            start periodic broadcast on Iface;
            }
      }

10    ipx_rip_IfaceDown(
            Iface
            )
      {
            stop all broadcasts on this Iface.
15          mark Iface as not connected.
            if(link state is bad)
                    invalidate all routes through Iface;
      }

20    ipx_rip_output(
            destinationNetworkAddress,
            triggeredOutput,
            outputIface
            )
25    {
            if(outputIface is disabled for IPX RIP)
```

```
                    return;
            if(outputIface is not connected)
                    return;
            if(outputIface is a virtual interface AND
5                       (outputIface is configured for Force AND
                            NOT first connect after system reboot)
                )
                    return;
            if(triggeredOutput)
10                  send only changes to IPX RIP table;
            else
                    send complete IPX RIP table;
        }

15      ipx_rip_input(
            ripPacket,
            sourceNetworkAddress,
            inputIface
            )
20      {
            if(inputIface is refused or sourceNetworkAddress is refused)
            {
                    discard packet;
                    return;
25          }
            if(sanity checks on ripPacket failed)
```

```
        {
            discard packet;
            return;
        }
5       switch(RIP operation requested)
        {
        case RIP_REQUEST:
            if(inputIface is disabled)
            {
10              discard packet;
                return;
            }
            if(requested route Iface NOT the same as inputIface)
                send requested route information;
15      case RIP_RESPONSE:
            perform IPX standard RIP algorithm;
            if(route to be added already exists and is static)
                ignore RIP learnt route;
            if(inputIface is configured for Publish)
20              add new route as Public (to be included in
                RIP advertisements)
            else
                add new route as Private (not to be included
                in RIP advertisements)
25          NOTE: Multiple routes are maintained by the routing
            table manager.
```

```
        }
        if(routing table was modified){
            send updates to all connected interfaces;
            send updates to all interfaces configured as Forced;
        }
    }

Algorithm for Enhancements to Novell's IPX Service Advertisement
Protocol (SAP):

ipx_sap_IfaceUp(
    Iface
    )
{
    mark iface as connected;
    if(Iface is NOT configured for Force OR
        (Iface is configured for Force AND
            this is the first connect after system reboot)
        )
    {
        /* The age out ensures invalid information is not
         * retained due to lost synchronization.
         */
        start ageOutTimer for all services that are reached
            through this interface;
        /* The full table send/request forces both routers to
```

```
             * synchronize their tables.
             */
            send full table broadcast;
            request full table broadcast;
 5          if(Iface is configured for Force)
                mark Iface as having connected after reboot;
            if(Iface is configured for Periodic)
                start periodic broadcast on Iface;
        }
10  } ipx_sap_IfaceDown(
        Iface
        )
15  {
        stop all broadcasts on this Iface.
        mark Iface as not connected.
        if(link state is bad)
            invalidate all services reached through Iface;
20  } ipx_sap_output(
        destinationNetworkAddress,
        triggeredOutput,
25      outputIface
        )
```

```
        {
            if(outputIface is disabled for IP RIP)
                return;
            if(outputIface is not connected)
  5             return;
            if(outputIface is a virtual interface AND
                    (outputIface is configured for Force AND
                        NOT first connect after system reboot)
                )
 10             return;
            if(triggeredOutput)
                send only changes to IPX SAP table;
            else
                send complete IPX SAP table;
 15     } ipx_sap_input(
            sapPacket,
            sourceNetworkAddress,
 20         inputIface
            )
        {
            if(inputIface is refused or sourceNetworkAddress is refused)
            {
 25             discard packet;
                return;
```

```
            }
            if(sanity checks on sapPacket failed)
            {
                discard packet;
 5              return;
            }
            switch(SAP operation requested)
            {
            case SAP_REQUEST:
10              if(inputIface is disabled)
                {
                    discard packet;
                    return;
                }
15              send requested information if it is available;
            case SAP_RESPONSE:
                perform IPX standard SAP algorithm;
                if(service to be added already exists and is static)
                    ignore SAP learnt service;
20              if(inputIface is configured for Publish)
                    add new service as Public (to be included in
                    SAP advertisements)
                else
                    add new service as Private (not to be included
25                  in SAP advertisements)
            case SAP_GET_NEAREST_SERVER:
```

```
        if(nearest FileServer that is known is reached through
           inputIface)
        {
            discard packet;
            return;
        }
        send nearest FileServer that we know about;
    }
    if(service table was modified){
        send updates to all connected interfaces;
        send updates to all interfaces configured as Forced;
    }
}
```

PHYSICAL IMPLEMENTATION

In one embodiment of the present invention, an Intel iAPX 386 processor based computer system with 2 MegaBytes of memory expandable up to 8 MegaBytes of memory is utilized for performing the algorithms and other functions described above, and for controlling communications between the System and other units, which may be BMS system or other system. This computer system has a minimum of 4 asynchronous serial ports and can support up to 20 asynchronous serial ports. Alternatively it can support up to 2 synchronous serial ports for ISDN or switched 56K access.

In another embodiment of the present invention, an Intel iAPX 486 processor based computer system with 2 MegaBytes of memory expandable up to 16 MegaBytes of memory is utilized for performing the algorithms and other functions described above, and for controlling communications between the System and other units, which may be BMS systems or other systems. This computer system also has a minimum of 4 asynchronous serial ports and can support up to 36 asynchronous serial ports. Alternatively it can support up to 4 synchronous serial ports for ISDN or switched 56K access.

In either of the above two embodiments, any of the serial ports can be configured as switched or dedicated non-switched. If the asynchronous serial lines are configured as switched, any Hayes AT command set compatible modem can be used. If the synchronous serial lines are configured as switched, any hayes AT command set compatible DCE or V.25bis compatible DCE can be used.

APPENDIX A

NEC AMERICA, INC.

Transmission Development Division

MCS–MODEMCAP LANGUAGE SPECIFICATION

Document No.: #32-000689-LS1107

(Revision 3)

September 27, 1993

Author:

Ladavan Thaweethai

---

Copyright NEC America, Inc., 1992

NEC America, San Jose, CA U.S.A

MCS – Modemcap Language Specification

ABSTRACT

This document describes the MCS Modem Capabilities Language, also known as Modemcap Language. The grammar and syntax of the language are specified. Modemcap defines the AT command strings needed for controlling different type of modems installed in the MCS system.

MCS – Modem ca  nguag  ecification

REVISION HISTORY

Revision 0: 05/20/92
Reason: To establish the original document.
Issued By: Anne Moon

Revision 1: 06/02/92
Reason: Add new reserved keywords & add more language descriptions
Issued By: Ladavan Thaweethai

Revision 2: 06/08/92
Reason: Modify after review meeting.
        Note: Underline item (Include All keyword) will not be supported in the first release.
Issued By: Ladavan Thaweethai

Revision 3: 09/27/93
Reason: Allow multiple compression patterns.
Issued By: Ladavan Thaweethai MCS – Modemcap guage :cification

TABLE OF CONTENTS

1. INTRODUCTION .......................................................... 1
   1.1. Purpose ............................................................ 1
   1.2. Overview ........................................................... 1
2. MoDEMCAP DATABASE ................................................. 1
3. MODEMCAP Language Specification ............................... 5
   3.1. Example ............................................................ 7

MCS – ModemCap Language Specification

1. INTRODUCTION

1.1. Purpose

This document describes the Modemcap Language. The Modemcap Language defines the set of lexical and grammar rules which enable construction of the Modemcap file. Modemcap is the database of modem capabilities and the AT command set that can be issued by the MCS for control of modem operations. The Modemcap file is kept in an ordinary text file which may be edited whenever necessary. For example, if a new type of modem is physically introduced to the system, but is not yet defined in the Modemcap file, a new entry can be added. Similarly, capabilities already written into the Modemcap file may be appended.

1.2. Overview

In this document Section 2 gives a general description of the Modemcap database and provides and informal description of the Modemcap structure. Section 3 gives a formal specification of the Modemcap Language and an example of a Modemcap file.

2. MODEMCAP DATABASE

The Modemcap begins with a title line "MCS MODEM CAPABILITIES", followed by a list of modem entries. Each modem entry occupies several lines, and the entries follow one another in an arbitrary order.

Modem entries consist of the modem name and a collection of capabilities which are enclosed within a pair of braces. The colon character (:) is the delimiter for the modem name and its capability set. The modem name is a text string with leading alphabet (max. to 20 characters). An example of modem capability set is shown below.

*I9632:* { *#(Interrogate,ati){(0,"910"),(3,"I9632")};*
    *$include(I9631,Dial);*
    *(MNPMode,at\n) {(Normal,0),(Direct,1),(Reliable,2),(AutoRel,3)}; }*

All the capabilities are divided into four categories: Interrogation, Pattern, Inclusion and System/User Defined. There must be one and only one capability in the Interrogation category. This capability is used to interrogate the modem for type and version information. The other three categories may contain zero or more items. The semicolon character (;) is also used as a delimiter between entries. In the Modemcap file, all the White spaces (tab, space, or Line feed) are ignored.

MCS – ModemCap Languag Specification

Interrogation Modemcap Entry

The Interrogation capability begins with the pound sign character (#), and an indicator which is an ordered pair containing (a) the keyword Interrogate, and (2) the basic AT command for requesting modem information. These are enclosed within a pair of parentheses and are separated each other by a comma character (,). *From now on, an order pair in this context always means a parenthesized pair which is separated by a comma, to differentiate the items within the pair.* A list of options enclosed within a pair of braces follows right after the indicator. The options are separated from each other by a comma. Each option is an ordered pair containing option identifier and response string. The response string is enclosed within quotation marks. The interrogation information is used by MCS to determine the modem type currently attached to a port. The following is an example of a legal interrogation capability:

(Interrogate, ati){(3, "N9635E/PLUS")};

Interrogation information is used by MCS to determine the type of modem currently attached to a port. In the above example, MCS sends "ati3" to the modem. If the modem responds with "N9635E/PLUS", then the modem type can be determined. It is important that the interrogation response string be unique for each modem type entry.

Pattern Modemcap Entry

Pattern modemcap entries are used for pattern matching of the modem response. When the modem is connected, it sends the Modulation rate and compression information in text. MCS uses the pattern defined in this modemcap entry to look for specific patterns in determination of the modulation rate and compression information. Each pattern modemcap entry contains two sections—type and a list of pattern text—enclosed in parentheses. The type can be either "ModRate" or "Compression". Each pattern text is specified in quotes. The modulation rate pattern is the prefix of the actual modulation rate. MCS will extract the numeric digits (in baud rate) which appear after the specified pattern. The list of Compression pattern texts can be specified. One of the compression text must matched exactly, in order to determine whether the compression is in used or not. Both modulation rate and compression information are the parameters used to compute CU (Capacity Unit). An example of pattern modemcap entries are:

&(ModRate, "CARRIER"); &(Compression, "V.42BIS", "MNP 5");

Include Modemcap Entry

Included items begin with a dollar sign character ($) and the keyword include. *Include* modemcap entries are used for referencing to previously established modemcap definitions. Each *include* item is an ordered pair which contains a modem name and MCS – ModemCap Language Specification Modemcap identifier. The Modemcap identifier is an alphabetical string of up to 20 characters. All the Modemcap identifiers fall into one of two groups: system defined and user defined. Both system defined and user defined groups can be used in the include entry. The description of system defined modemcap identifiers will be described later. Examples of include modemcap entries are shown below.

$include(I9632, Dial); $include(I9632, AutoAns);

Note that the modem type in the include modemcap entry must be defined before it can be included.

System/User Defined Modemcap Entry

The system/user defined modemcap capability starts with an ordered pair consisting of the modem identifier and its associated basic AT command. The modem identifier can be either the system defined group or user defined group. A list of options enclosed within a pair of braces follows immediately after. An empty list without any options is valid. Should multiple options exist, they are separated from each other by a comma. Each option is an ordered pair with an option identifier and option code. The option code indicates the alternatives of the basic AT command. The basic AT command in conjunction with the option code make up the actual command that can be used to control the modem operation. For example: the basic AT command to set the MNP operation.

(MNPMode,at\n) {(Normal,0),(Reliable,2),(AutoRel,3)};

The AT command string to enable MNPMode to Normal, Reliable and AutoRel mode are "at\n0", "at\n2" and "at\n3" respectively. In this example, the modem tags called *MNPModeNormal*, *MNPModeReliable* and *MNPAutoRel* will be available to be defined as part of the modem characteristics record.

System Defined Modemcap Identifiers

The system defined modemcap identifiers are also referred as "system defined tags". They are reserved for MCS usage. These keywords are:

| | |
|---|---|
| InitConf: | Initialize Modem configuration. See more description of InitConf below. |
| Dial: | Originate a dialing. |
| AutoAns: | Change Auto answer mode. Possible options are: – Enable, Disable. |
| Hook: | Hang up command. Possible options are GoOn, GoOff. |
| CDdelay: | Set the Carrier Detect hang up delay in the modem. The unit is in 1/10 second. |

MCS – ModemCap Languag. ,ecification

MCS uses the system defined tags to configure the modem. Upon initialization, MCS either sends the AT command string associated with the *InitConf* to the modem. When MCS is dialing out to a remote destination, the *Dial* AT command string appended with the destination phone number is used such as "atdt9800123-1234". MCS also configures the modem according to the port parameter defined in the MCS database. The *AutoAnsEnable* and *AutoAnsDisable* system defined tags are used to enable or disable modem to wait or not to wait for incoming calls. The *HookGoOn* and *HookGoOff* system tags are configure the modem to go on hook or go off hook. When the port is disabled, MCS sends "ath1" which corresponds to *HookGoOff* system tag to the modem. The CD delay of the port parameter is set to 1400 milliseconds, MCS sends "ats10=14" to the modem.

User Defined Modemcap Identifiers

The user defined modemcap identifiers are used as tags in the Modem Characteristic record of the MCS database. MCS sends AT commands of the corresponding tags to configure the modem in a specific mode. For instance, in the following modem cap entry controls the MNP operation mode. If the Modem characteristic record contains *MNPModeNormal* tag, then MCS will send the "at\n0" to the modem.

*(MNPMode,at\n) {(Normal,0),(Reliable,2),(AutoRel,3)};*

InitConf Modemcap Entry

This modemcap entry defines the AT command string to initialize the Modem to a known state expected by MCS. The MCS expects the modem to be configured as followed:

- load factory setting;
- echo off;
- verbal response;
- extended result code;
- return DCE Speed and compression information in the response.
- DTR On enables auto answer or originate, DTR Off drops line & disable auto-answer;
- DCD follow line;
- DSR on after answer tone is detected and stay on through the connection;
- Use CTS-RTS hardware flow control;
- Ring detect signal blink during ring and remains off when off hook;
- set auto DTE speed equal to last AT command.
- set DTE connection to no parity, 8 data bits, 1 stop bit. (MCS will always uses this setup in command mode.)
- set up for asynchronous mode.

MCS — ModemCap Language Specification

- use buffered mode with or without error control. Never use direct mode.
- result code is sent in both originate mode and answering modem.

Example:
*N9631: (InitConf,at&f1e0\v1&d2&c1\q3\r0){};*

3. MODEMCAP LANGUAGE SPECIFICATION

The MCS Modemcap Language is defined using BNF (Backus Naur Form). UNIX's utility program Yacc and Lex are used to generate the parser for this language. The code generated by Yacc and Lex are incorporated to MCS. In addition, a parser is also available to run as a stand alone program on DOS. This allows the user to check the syntax prior to loading the Modemcap file with MCS.

| | | |
|---|---|---|
| *modem−cap−definition* | : | MCS MODEM CAPABILITIES:<br>*modem−entries* |
| *modem−entries* | : | *modem−entry* \|<br>*modem−entries modem−entry* |
| *modem−entry* | : | *modem−name cap−entries* |
| *modem−name* | : | *alphabetical−string* : |
| *cap−entries* | : | *null−cap−entry* \|<br>*regular−cap−entry* |
| *null−cap−entry* | : | {} |
| *regular−cap−entry* | : | { *definition−lines* } |
| *definition−lines* | : | *definitions* \|<br>*definition−lines definitions* |
| *definitions* | : | *cap−definitions* \|<br>*cap−include−definitions* \|<br>*inquire−definitions* \|<br>*pattern−definitions* |
| *inquire−definitions* | | *inquire−id response−info* ; |
| *inquire−id* | : | #( *inquire−keyword−string, AT−command−string* ) |

MCS - ModemCap Language Specification

| | | |
|---|---|---|
| *response-info* | : | { *responses* } |
| *responses* | : | *response* \|<br>*responses , response* |
| *response* | : | ( *name-string , quoted-string* ) |
| *cap-definitions* | : | *cap* \|<br>*cap-definitions cap* |
| *cap* | | *cap-identifier option-definitions* ; \|<br>*reserved-cap-identifier option-definitions* ; |
| *reserved-cap-identifier* | : | ( *cap-keyword-string , AT-command-string* ) |
| *cap-identifier* | : | ( *alphabetical-string , AT-command-string* ) |
| *option-definitions* | : | *null-option* \|<br>*option-set*; |
| *null-option* | : | {}; |
| *option-set* | : | { *options* } |
| *options* | : | ( *name-string , name-string* ) |
| *cap-include-definitions* | : | *include-item* \|<br>*cap-include-definitions include-item* |
| *include-item* | : | $ *include-keyword-string include-parameter* ; |
| *include-parameter* | : | ( *alphabetical-string, cap-keyword-string* ) |
| *include-keyword-string* | : | include |
| *Inquire-keyword-string* | : | interrogate |
| *cap-keyword-string* | : | InitConf \|<br>Dial \| \|<br>AutoAns \|<br>CDdelay \| |

MCS – ModemCap Language  :ification

Hook

| | | |
|---|---|---|
| *pattern – definitions* | : | *pattern* \|<br>*pattern – definitions pattern* |
| *modrate – pattern* | : | &( ModRate, *quate – string* ) ; |
| *comp – pattern* | : | &( Compression, *quoted – string – list* ) ; |
| *quote – string – list* | : | *quoted – string* ; \|<br>*quoted – string – list* |
| *pattern – keyword – string* | : | *modrate – pattern* \|<br>*comp – pattern* |
| *AT – command – string* | : | A text string begins with "AT" or "at" string followed with up to 38 character(s) from the set<br>{ \, *, %, +, &, ~, !, ', @, -, ", A–Z, a–z, 0–9 } |
| *alphabetical – string* | : | A string of leading alphabet followed with up to 20 character(s) from the following set<br>{ A–Z, a–z, 0–9 } |
| *name – string* | : | A string contains character(s) from the following set:–<br>{0–9, A–Z, a–z, /, =, !, %, \, –}<br>Maximum length for Option name – string is 8 characters. |
| *quoted – string* | : | A text string enclosed in "". Maximum length is 20 characters. |

MCS – ModemCap Language cification

3.1. Example

The following is an example of the file contains some valid sample of Modem Capabilities:

```
MCS MODEM CAPABILITIES
N9631: {
            #(Interrogate,ati){(3,"N9631")};
            (InitConf,at&fle0\v1&d2&c1\q3\r0){};
            (AutoAns,ats0=){(Disable,0),(Enable,1)};
            (Dial,atdt) {};
            (Hook,ath){(GoOn,0),(GoOff,1)};
            (CDdelay,ats10=){};
            (DCESpeed,at%b){(2400,3),(4800,4),(9600,5),(9600t,6)};
}

N9635EP: {
            #(Interrogate,ati){(3,"N9635E/PLUS")};
            (InitConf,at&fe\v3&d2&c1\q3){};
            $include(N9631,CDdelay);
            $include(N9631,AutoAns);
            $include(N9631,Hook);
            $include(N9631,Dial);
            (DCESpeed,at%g1%b){(2400,3),(4800,4),(9600t,6),(14400,7)};
            &(ModRate,"CARRIER "); &(Compression,"V.42bis","REC");
}
N9635E2: {
            #(Interrogate,ati){(3,"N9635E2")};
            (InitConf,at&fe0\v1&d2&c1\q3){};
            $include(N9631,CDdelay);
            $include(N9631,AutoAns);
            $include(N9631,Hook);
            $include(N9631,Dial);
            (DCESpeed,at%g1%b){(2400,3),(4800,4),(9600t,6)};
            &(ModRate,"CARRIER "); &(Compression,"V.42bis","REC");
}
```

APPENDIX B

NEC AMERICA, INC.

Transmission Development Division

MCS – CHAT SCRIPT LANGUAGE SPECIFICATION

Document No.: #32-000689-LS1106

(Revision 2)

September 28, 1993

Author:

Ladavan Thaweethai

---

Copyright NEC America, Inc., 1992

NEC America, San Jose, CA U.S.A

MCS Chat Script Language Specification

ABSTRACT

This document describes the MCS Chat Script Language (CSL). The grammar and syntax of CSL is specified. CSL defines the state table of the Finite State Machine (FSM) which performs the chatting between the local MCS and a remote MCS or remote host.

MCS Chat Script L   uage S    fication

REVISION HISTORY

Revision 0 : 04/27/92
Reason: To establish the original document.
Issued By: Ladavan Thaweethai

Revision 1 : 05/14/92
Reason: Add setport() action.
Remove $loginname, $loginpassword & $ipaddress reserved keywords from sendstring() action.
Add Section 3.2 to 3.5 for grammar descriptions.
Issued By: Ladavan Thaweethai

Revision 2 : 09/27/93
Reason: Remove Chat Data Language Specification from this document.
Remove setport and doscreat action.
Issued By: Ladavan Thaweethai MCS Chat Script Lang    Spec    ion

TABLE OF CONTENTS

| | | |
|---|---|---|
| 1. | INTRODUCTION | 1 |
| | 1.1. Purpose | 1 |
| | 1.2. Overview | 1 |
| 2. | FINITE STATE MACHINE | 1 |
| 3. | CHAT SCRIPT LANGUAGE (CSL) | 1 |
| | 3.1. Language Specification | 2 |
| | 3.2. Chat Script Description | 4 |
| | 3.3. State Description | 4 |
| | 3.4. Event Description | 4 |
| | 3.5. Action Description | 5 |
| 4. | EXAMPLE | 6 |

MCS Chat Script Language Specification

MCS CHAT SCRIPT LANGUAGES SPECIFICATION

1. INTRODUCTION

1.1. Purpose

This document describes the MCS Chat Script Language (CSL). The grammar and syntax of this language is specified. CSL defines the state tables of the Finite State Machine (FSM). It is the FSM which performs the chatting between the local MCS and a remote MCS or remote host.

1.2. Overview

This document is composed of the following sections.

Section 2 – Finite State Machine

Section 3 – Chat Script Language Definition

Section 4 – Examples

2. FINITE STATE MACHINE

Chatting between the local and the remote MCS can be driven by a Finite State Machine. When a remote MCS dials in to the local MCS, the local MCS performs login authentication, IP address negotiation, etc. It is required that the remote MCS must be able to send login name, password, IP address, etc. to the local automatically (i.e. without user intervention). A Finite State Machine is used by the remote host to perform this task.

The FSM is state oriented. Upon an *event*, it performs *actions* then transits to the next state. A login prompt is an example of an event. Actions may include such acts as sending the login name and transiting to the next state in which to wait for the next event, (e.g. the "Password:" prompt).

Input to the FSM consists of initial actions and a table of states. States consists of a state identifier and one or more events. For each event, there are one or more actions. When FSM is in a state, it waits for an event to occur. FSM then performs the actions specified for that event. Normally, the last action of an event transits to the next state. If there is no transit action found, the FSM remains in the same state. The FSM terminates when the exit action is encountered. The success or failure can be returned using this exit code.

3. CHAT SCRIPT LANGUAGE (CSL)

The Chat Script Language is defined by using BNF (Backus Naur Form). The parser used in the Chat Script Language is generated from UNIX's Yacc and Lex utility MCS Chat Script uage Specification programs. Code which is generated by Yacc and Lex is incorporated into MCS. This parser can run as a stand alone program on DOS, thereby allowing the user to check the syntax prior to loading the Chat Script file onto MCS.

The language also provides counter manipulation for looping around a set of states. The counter manipulations action includes *initialize, increment* and *decrement*. Conditional events—zero and nonzero— are provided to test the content of a counter and to perform the actions according to the test result.

3.1. Language Specification

| | |
|---|---|
| *chat–script–definition*: | CHATSCRIPT ( *chat–script–name* ) {<br>    *initial–actions*<br>    *states*<br>} |
| *chat–script–name*: | String of the following characters (max. 20 chars)<br>The first char cannot be a digit or under score.<br>A–Z, a–z, 0–9, _ |
| *initial–actions*: | { *actions* } |
| *actions*: | *actions* ; *action* \|<br>*action* |
| *states*: | *states state* \|<br>*state* |
| *state*: | *state–identifier* : *state–body* |
| *state–identifier*: | String of the following characters (max. 20 chars)<br>The first char cannot be a digit or under score.<br>A–Z, a–z, 0–9, _ |
| *state–body*: | { *events* } \|<br>{ *actions* } |
| *events*: | *events event* \|<br>*event* |
| *event*: | *event–type* { *actions* } |
| *event–type*: | recvstring ( "*quote–text*" ) \|<br>timeout ( *seconds* ) \|<br>zero ( *counter* ) \|<br>nonzero ( *counter* ) ; |

MCS Chat Script ... uage S ...ification

| | |
|---|---|
| *action:* | sendstring ( *"quote−text"* ) \|<br>sendstring ( *send−string−keyword* )<br>init ( *counter, digits* ) \|<br>increment ( *counter* ) \|<br>decrement ( *counter* ) \|<br>transit ( *state−identifier* ) \|<br>exit ( *exit−code* ) |
| *send−string−keyword:* | *reserved−keyword* |
| *reserved−keyword:* | $hostname \|<br>$hostpassword \|<br>$hostipaddress<br>$dialoutname \|<br>$dialoutpassword |
| *quote−text:* | Text composed of any printable characters including blanks. Back slash is used to escape the next character as found in C programing language. For example:<br>  \n for new line<br>  \" for quote<br>  \\ for back slash<br>  \27 for octal number 27. |
| *counter:* | String of the following characters (max. 19 chars)<br>The first char cannot be a digit or under score.<br>A−Z, a−z, 0−9, _ |
| *exit−code:* | One of the following digit:−<br>  0 = success<br>  1 = failed<br>  2 = timeout<br>  3 = callback |
| *seconds:* | Positive integer 0−999 specified number of seconds. |
| *digits:* | Positive integer 0−999 |

MCS Chat Script  ,uage ' ·ification

3.2. Chat Script Description

*chat—script—definition*:    CHATSCRIPT ( *chat—script—name* ) {
                                                         *initial—actions*
                                                         *states*
                            }

A chat script definition is consists of the name, initial actions and a set of states. Upon chatscript startup, the finite state machine executes all initial actions first. The last action in the initial action set should be a transit action statement into the first state to be executed. This definition also contains a set of states relevant to the finite state machine. The finite state machine transits from one state to another state until it is terminated.

3.3. State Description

*state:*          *state—identifier* : *state—body*

*state—body:*     { *events* } |
                  { *actions* }

*events:*         *events event* |
                  *event*

A state is consists of the state name and one or more events or actions. If a number of events are specified, the finite state machine waits for one of the events to occur, then executes the actions contained in the event statement. If a number of actions are specified instead of events, then the finite state machine executes the actions as soon as it enters the state.

3.4. Event Description

*event:*          *event—type* { *actions* }

*event—type:*     recvstring ( "*quote—text*" ) |
                  timeout ( *seconds* ) |
                  zero ( *counter* ) |
                  nonzero ( *counter* ) ;

An event consists of the event type and actions. The event can be a recvstring event, timeout event, zero event, or non-zero event.

For the recvstring event, the finite state machine waits for the specified text to arrived. The timeout event allows the finite state machine to abort the recvstring event upon expiration of the timer. Normally, the timeout event is used in conjunction with the recvstring event. If the recvstring event is used in a state without a timeout event, then the finite state machine waits for the specified text forever.

MCS Chat Script Language Specification

The zero and non-zero events allow the finite state machine to perform simple conditional branch based on the content of the specified counter. If the zero or non-zero events are used, the chat script definition must also contain the init action which initializes the counters.

3.5. Action Description action:
    sendstring ( *"quote-text"* ) |
    sendstring ( *send-string-keyword* )
    init ( *counter, digits* ) |
    increment ( *counter* ) |
    decrement ( *counter* ) |
    transit ( *state-identifier* ) |
    exit ( *exit-code* )

The action statement defines the action of the finite state machine.

The sendstring action allows the finite state machine to send either the quote-text or a predefined text associated with a keyword to the remote host.

The sendevent allows the finite state machine to send the specified text to the event log.

The init, increment and decrement actions initializes, increments and decrements the specified counter, respectively.

The transit action allows the finite state machine to start a new state.

The exit action terminates the finite state machine and return the exit code. Exit code 0 is used for normal termination. Other exit codes are used for abnormal termination.

MCS Chat Script Language Specification

4. EXAMPLE

Example 1 is a general Chat Script which is used between the local MCS and remote MCSs; wherein the local MCS is performing the login authentication while the remote MCS invokes FSM to perform the chatting.

Example 1:

```
CHATSCRIPT( mcschat ) {
            {init(lpcount, 3); transit(state1) }
            state1:{
                        recvstring("Login:"){
                                    sendstring($dialoutname);
                                    transit(state2)
                        }
                        timeout(5) {
                                    transit(tryagain)
                        }
            }
            state2:{
                        recvstring("Password:") {
                                    sendstring($dialoutpasswd);
                                    transit(state3)
                        }
                        timeout(5) {
                                    transit(tryagain)
                        }
            }
            state3:{
                        recvstring("IP Address") {
                                    sendstring($hostipaddr);
                                    transit(state4)
                        }
                        timeout(5) {
                                    transit(tryagain)
                        }
            }
            state4:{
                        recvstring("Callback") {
                                    exit(0)
```

MCS Chat Script Language Specification

```
            }
            recvstring("Destination") {
                    sendstring($hostname);
                    exit(0)
            }
            timeout(5) {
                    transit(tryagain)
            }
    }
    tryagain:{
            nonzero(lpcount) {
                    decrement(lpcount);
                    sendstring("\n\n\n");
                    transit(state1)
            }
            zero(lpcount) {
                    exit(1)
            }
    }
}
```

We claim:

1. An authentication apparatus for use by a network server, said apparatus comprising first enabling means for enabling the network server to establish ongoing communication with a plurality of types of user units, and second enabling means for enabling the network server to communicate with user units utilizing a plurality of types of authentication procedures, said authentication procedures each defining a different sequence of information exchanges between said user units and said server.

2. An authentication apparatus as recited in claim 1, wherein said apparatus utilizes a finite state machine to allow said network server to respond to said plurality of types of authentication procedures.

3. An authentication apparatus as recited in claim 2, wherein said finite state machine is implemented using a chat script language comprising statements.

4. An authentication apparatus as recited in claim 3, wherein said chat script language is written in Backus Naur form.

5. An authentication apparatus as recited in claim 4, said apparatus:

able to store several chat scripts, each of the chat scripts appropriate for use in communicating with a corresponding one of said user units; and able to invoke one of the chat scripts to perform automatic chatting with the corresponding one of said user units.

6. An authentication apparatus as recited in claim 3, wherein said chat script language:

allows a single one of said statements to comprise multiple text lines; and allows a plurality of said statements to be comprised by a single text line.

7. An authentication apparatus as recited in claim 1, said apparatus:

able to store several chat scripts, each of the chat scripts appropriate for use in communicating with a corresponding one of said user units; and able to invoke one of the chat scripts to perform automatic chatting with the corresponding one of said user units.

8. An authentication apparatus as recited in claim 3, said apparatus:

able to store several chat scripts, each of the chat scripts appropriate for use in communicating with a corresponding one of said user units; and able to invoke one of the chat scripts to perform automatic chatting with the corresponding one of said user units.

9. An authentication apparatus as recited in claim 2, wherein said finite state machine is used by said network server to specify how to respond to login sequences required by said user units.

10. An authentication apparatus as recited in claim 9, wherein said finite state machine allows for a plurality of states, and each of the plurality of states is responsive to at least one event, including at least one of (1) a time-out and (2) a match of an input from one of said user units with a text string pattern.

11. An authentication apparatus as recited in claim 10, said apparatus:

able to store several chat scripts, each of the chat scripts appropriate for use in communicating with a corresponding one of said user units; and able to invoke one of the chat scripts to perform automatic chatting with the corresponding one of said user units.

12. An authentication apparatus as recited in claim 9, said apparatus:

able to store several chat scripts, each of the chat scripts appropriate for use in communicating with a corresponding one of said user units; and able to invoke one of the chat scripts to perform automatic chatting with the corresponding one of said user units.

13. An authentication apparatus as recited in claim 2, wherein said finite state machine is written in a chat script language and defines states, initial actions, events, and actions, the states including lists of the events, each event defining a respective action, and the actions including at least one of string output, time delay, variable manipulation, transit to another state, and exit from the finite state machine.

14. An authentication apparatus as recited in claim 13, wherein upon exit from said finite state machine, an exit code is generated specifying one of success and failure of authentication.

15. An authentication apparatus as recited in claim 14, said apparatus:

able to store several chat scripts, each of the chat scripts appropriate for use in communicating with a corresponding one of said user units; and able to invoke one of the chat scripts to perform automatic chatting with the corresponding one of said user units.

16. An authentication apparatus as recited in claim 13, said apparatus:

able to store several chat scripts, each of the chat scripts appropriate for use in communicating with a corresponding one of said user units; and able to invoke one of the chat scripts to perform automatic chatting with the corresponding one of said user units.

17. An authentication apparatus as recited in claim 2, wherein upon exit from said finite state machine, an exit code is generated specifying one of success and failure of authentication.

18. An authentication apparatus as recited in claim 17, said apparatus:

able to store several chat scripts, each of the chat scripts appropriate for use in communicating with a corresponding one of said user units; and able to invoke one of the chat scripts to perform automatic chatting with the corresponding one of said user units.

19. An authentication apparatus as recited in claim 2, said apparatus:

able to store several chat scripts, each of the chat scripts appropriate for use in communicating with a corresponding one of said user units; and able to invoke one of the chat scripts to perform automatic chatting with the corresponding one of said user units.

20. An authentication apparatus as recited in claim 1, said apparatus able to respond differently to login sequences of different respective types of said user units being communicated with.

21. An authentication apparatus as recited in claim 20, said apparatus:

able to store several chat scripts, each of the chat scripts appropriate for use in communicating with a corresponding one of said user units; and able to invoke one of the chat scripts to perform automatic chatting with the corresponding one of said user units.

22. An authentication apparatus as recited in claim 1, said apparatus:

able to store several chat scripts, each of the chat scripts appropriate for use in communicating with a corresponding one of said user units; and able to invoke one of the chat scripts to perform automatic chatting with the corresponding one of said user units.

23. An authentication process for use by a network server in establishing communication with a plurality of types of user units requiring a plurality of types of authentication procedures, said process comprising steps of:

establishing a connection for beginning an authentication dialog with a selected unit of the user units;

executing initial actions, including transfer to a first state of a finite state machine;

being receptive to an input signal from the selected unit;

remaining in the first state until a first event occurs; and once the first event occurs, executing at least one action defined apriori for that event, said action being one of (1) transfer to another state, (2) remaining in the same state, and (3) exit from the finite state machine.

24. An authentication process as recited in claim 23, wherein said first event is one of (1) a time-out and (2) a match of said input signal with a text string pattern defined apriori.

25. An authentication process as recited in claim 24, further comprising the step, upon one of said exit and another exit from said finite state machine, of generating an exit code specifying one of success and failure of authentication.

26. An authentication process as recited in claim 23, further comprising the step, upon one of said exit and another exit from said finite state machine, of generating an exit code specifying one of success and failure of authentication.

27. An authentication process as recited in claim 23, wherein upon occurrence of a given event, the given event being one of said first event occurring while in said first state, a second event occurring while in said second state, and a third event occurring while in a third state, a plurality of actions are all carried out sequentially without waiting for another event.

28. An authentication process as recited in claim 27, wherein said given event is one of (1) a time-out and (2) a match of said input signal with a text string pattern defined apriori.

29. An authentication process as recited in claim 28, wherein one of said plurality of actions is exit from the finite state machine, and further comprising the step, upon the exit from said finite state machine, of generating an exit code specifying one of success and failure of authentication.

30. An authentication process as recited in claim 27, wherein one of said plurality of actions is exit from the finite state machine, and further comprising the step, upon the exit from said finite state machine, of generating an exit code specifying one of success and failure of authentication.

31. An authentication process for use by a network server in establishing communication with a plurality of types of user units requiring a plurality of types of authentication procedures, said process comprising the steps of:

establishing a connection for beginning an authentication dialog with a selected unit of the user units;

choosing a chat script corresponding to an authentication procedure appropriate for use with the selected unit;

executing initial actions, including transfer to a first state of a finite state machine defined according to the chat script chosen;

being receptive to an input signal from the selected unit;

remaining in the first state until a first event occurs; and once the first event occurs, executing at least one action, defined apriori for that event, said action being one of (1) transfer to a second state, (2) remaining in the first state, and (3) exit from the finite state machine.

32. An authentication process as recited in claim 31, wherein said first event is one of (1) a time-out and (2) a match of said input signal with a text string pattern defined apriori.

33. An authentication process as recited in claim 32, further comprising the step, upon one of said exit and another exit from said finite state machine, of generating an exit code specifying one of success and failure of authentication.

34. An authentication process as recited in claim 31, further comprising the step, upon one of said exit and another exit from said finite state machine, of generating an exit code specifying one of success and failure of authentication.

35. An authentication process as recited in claim 31, wherein upon occurrence of a given event, the given event being one of said first event occurring while in said first state, a second event occurring while in said second state, and a third event occurring while in a third state, a plurality of actions are all carried out sequentially without waiting for another event.

36. An authentication process as recited in claim 35, wherein said given event is one of (1) a time-out and (2) a match of said input signal with a text string pattern defined apriori.

37. An authentication process as recited in claim 36, wherein one of said plurality of actions is exit from the finite state machine, and further comprising the step, upon the exit from said finite state machine, of generating an exit code specifying one of success and failure of authentication.

38. An authentication process as recited in claim 35, wherein one of said plurality of actions is exit from the finite state machine, and further comprising the step, upon the exit from said finite state machine, of generating an exit code specifying one of success and failure of authentication.

39. An authentication procedure for use by a network server, said procedure comprising the steps of enabling a plurality of types of user units to establish ongoing communication with a plurality of types of user units, and enabling the network server to communicate with user units utilizing a plurality of types of authentication procedures, said authentication procedures each defining a different sequence of information exchanges between said user units and said server.

* * * * *

UNITED STATES PATENT AND TRADEMARK OFFICE
CERTIFICATE OF CORRECTION

PATENT NO. : Patent No.: 5,678,004
DATED : Dated: October 14, 1997
INVENTOR(S) : Inventor(s): Ladavan THAWEETHAI

It is certified that error appears in the above-identified patent and that said Letters Patent is hereby corrected as shown below:

Column 2, line 34, delete "pro" and insert --pre--;

Column 4, line 37, delete "it's" and insert --its--;

Column 10, line 22, delete "2" and insert --3--;

Column 13, line 48, after "will" insert --be--;

Column 16, line 22, delete "|1&d2&c1<3[r]" and insert --\v1&d2&c1\q3\r0--;

UNITED STATES PATENT AND TRADEMARK OFFICE
CERTIFICATE OF CORRECTION

PATENT NO. : Patent No.: 5,678,004
DATED : Dated: October 14, 1997
INVENTOR(S) : Inventor(s): Ladavan THAWEETHAI It is certified that error appears in the above-identified patent and that said Letters Patent is hereby corrected as shown below:

Column 16, line 29, delete "|13&d2&c1<3" and insert --\v3&d2&c1\q3--;

Column 16, line 34, after "at" insert --\n--;

Column 16, line 40, delete "|1&d2&c1<3" and insert --\v1&d2&c1\q3--;

Column 18, line 19, delete "Defualt" and insert --Default--;

Column 18, line 27, delete "mode" and insert --modem--;

Column 19, lines 1-10, delete these lines in their entirety;

Signed and Sealed this

Fourteenth Day of April, 1998

Attest:

BRUCE LEHMAN

*Attesting Officer*     *Commissioner of Patents and Trademarks*